United States Patent
Seidel et al.

(10) Patent No.: US 6,665,422 B1
(45) Date of Patent: Dec. 16, 2003

(54) METHOD AND DEVICE FOR RECOGNIZING DISTRIBUTION DATA ON POSTAL PACKETS

(75) Inventors: Gert Seidel, Constance (DE); Göran Keil, Berlin (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 09/297,975
(22) PCT Filed: Oct. 30, 1997
(86) PCT No.: PCT/DE97/02526

§ 371 (c)(1),
(2), (4) Date: Jul. 16, 1999

(87) PCT Pub. No.: WO98/21689
PCT Pub. Date: May 22, 1998

(30) Foreign Application Priority Data

Nov. 12, 1996 (DE) ......................................... 196 46 522

(51) Int. Cl.⁷ .................................................. G06K 9/00
(52) U.S. Cl. ...................... 382/101; 209/3.1; 209/584; 209/900; 382/321
(58) Field of Search ................................. 382/101, 321; 209/583, 584, 3.1, 900

(56) References Cited

U.S. PATENT DOCUMENTS

| | | | |
|---|---|---|---|
| 4,992,649 A | * | 2/1991 | Mampe et al. ............... 209/546 |
| 5,031,223 A | * | 7/1991 | Rosenbaum et al. ........ 382/101 |
| 5,311,999 A |   | 5/1994 | Malow et al. |
| 5,754,671 A | * | 5/1998 | Higgins et al. .............. 382/101 |
| 6,239,397 B1 | * | 5/2001 | Rosenbaum ................. 209/584 |

FOREIGN PATENT DOCUMENTS

| | | |
|---|---|---|
| DE | 39 43 073 | 12/1989 |
| DE | 195 31 392 | 8/1995 |
| EP | 0076332 | 9/1981 |
| EP | 9589119 A1 | 9/1992 |
| EP | 08103733 | 4/1996 |

* cited by examiner

*Primary Examiner*—Bhavesh Mehta
*Assistant Examiner*—Gregory Desire
(74) *Attorney, Agent, or Firm*—Venable LLP; Robert Kinberg

(57) ABSTRACT

The present invention pertains to a method and device for recognizing distribution data on postal packets, small packages or journals during the automatic mail processing, especially to systems by which the automatic handwritten adress recognition process is supplemented and improved by video coding. The distribution data are written on various backgrounds, including pattern backgrounds. After a first unsuccessful optical character recognition attempt, the complete surface of the postal packet is displayed with a grid on a videocoding-screen. Once a picture segment has been selected which contains a larger part of the distribution data, the operator submits an image portion containing said picture segment and the adjacent areas to a new optical character assessment, while making sure that all the data area is included in the image portion. If the second optical character recognition attempt does not succeed, the image portion is reoriented as many times as required for the final video coding to appear on the screen.

7 Claims, 3 Drawing Sheets

METHOD AND DEVICE FOR RECOGNIZING DISTRIBUTION DATA ON POSTAL PACKETS

BACKGROUND OF THE INVENTION

Field of the Invention

The invention relates to the recognition of distribution information on mail items. In the broadest sense, the invention relates to the field of automatic mail-item processing, and particularly to systems in which an automatic OCR address-reading method is supplemented and improved by video coding.

Technical Background

Optical character recognition (OCR) is an established image-processing method in which images are recorded with an appropriate resolution, and machine-readable characters (letters, numbers) are ascertained from the images. This method is widely used in, for example, text processing, form reading and automatic sorting of mail items.

Systems for automatically reading addresses (OCR) are well-known in the field of letter processing, and are described in, for example, DE 195 31 392. Modern OCR letter-sorting systems can attain processing rates of ten letters per second, or 36,000 letters per hour, and higher. However, the recognition reliability varies greatly with the writing style and the overall quality of the address information located on the letter surface. In the event of successful recognition, the relevant letter can be provided with a machine-readable barcode. This barcode permits further mechanical processing up to an arbitrary sorting order. In particular, the use of barcodes permits a sorting of mail items, such as long letters or small parcels, up to the sorting level of the mail delivery, at which the delivery person sorts the items according to their distribution sequences.

The need for address reading also exists for larger parcels, newspapers and periodicals.

Although the above-described address reading is a tried-and-true technique, its use for the sizeable number of periodicals, newspapers, small packages and parcels that are mailed is limited by difficulties in automatically and reliably locating and reading the address region, also referred to as the ROI (Region of Interest). The problems associated with automatic ROI determination through image-processing methods occur particularly with flat mail items such as periodicals, newspapers, books and parcels because of background interferences or interfering surfaces. This is particularly due to the fact that different address labels are applied to a background that contains text (newspapers) or graphics (periodicals, magazines, books). Errors in ROI determination are critical, because they render the remaining automatic process impossible.

Although complex image-processing algorithms for ROI determination exist, various manual actions are necessary for performing the ROI search according to the current state of the technology.

In accordance with DE 394 30 73, a letter is placed on a digitization tray and fixed against stops. A marking pen is used to enter scanning coordinates for the address block of interest; the coordinates of the corner points of the address block are transferred to the system's control computer by way of an interface. This method can be used to process mass mailings, because the coordinates need only be entered once. This method is not effective for individual mail items, and cannot be performed for parcels.

The use of computer displays to support the automatic ROI search is described in Pattern Recognition, Volume 23, 1990, pp. 347–362, "Preprocessing and Presorting of Items for Automatic Sorting Using OCR," and EP 0 589 119.

The following disadvantages are associated with this practice:

- special input means that do not interrupt keyboard entry are necessary;
- precise location information about the ROI is necessary;
- large images of periodicals or parcels cannot be processed on a standard computer display;
- there is no integration of the ROI determination into the complete address-reading solution, including OCR and video coding.

There is therefore a need for a solution for fast and reliable determination of regions of interest, particularly address regions, with the aid of video coding in large video images of mail-item surfaces having different backgrounds, the solution permitting an online processing of the items. No input means should be necessary in addition to the keyboard for assuring fast video coding.

SUMMARY OF THE INVENTION

In many case, for distribution information that is located in large images with different backgrounds, it is not possible to automatically find and exclusively evaluate the information without the intervention of a video coder. The disclosed embodiment of the invention has, for the first time, combined video coding with the automatic OCR evaluation process, including the search for the regions (ROI) containing the desired information, especially with the zoom function initiated by the operator and the processing and display of the zoomed image section, all with little input effort, making the processing extremely fast. The multi-stage video-coding and OCR process has proven particularly effective, thus permitting an online processing of the mail items.

Moreover, this solution requires no special, costly monitors or workstations.

The invention is described in detail below by way of an embodiment.

The drawing shows in:

DETAILED DESCRIPTION OF THE PREFERRED EMBODIMENTS

Figure 1:
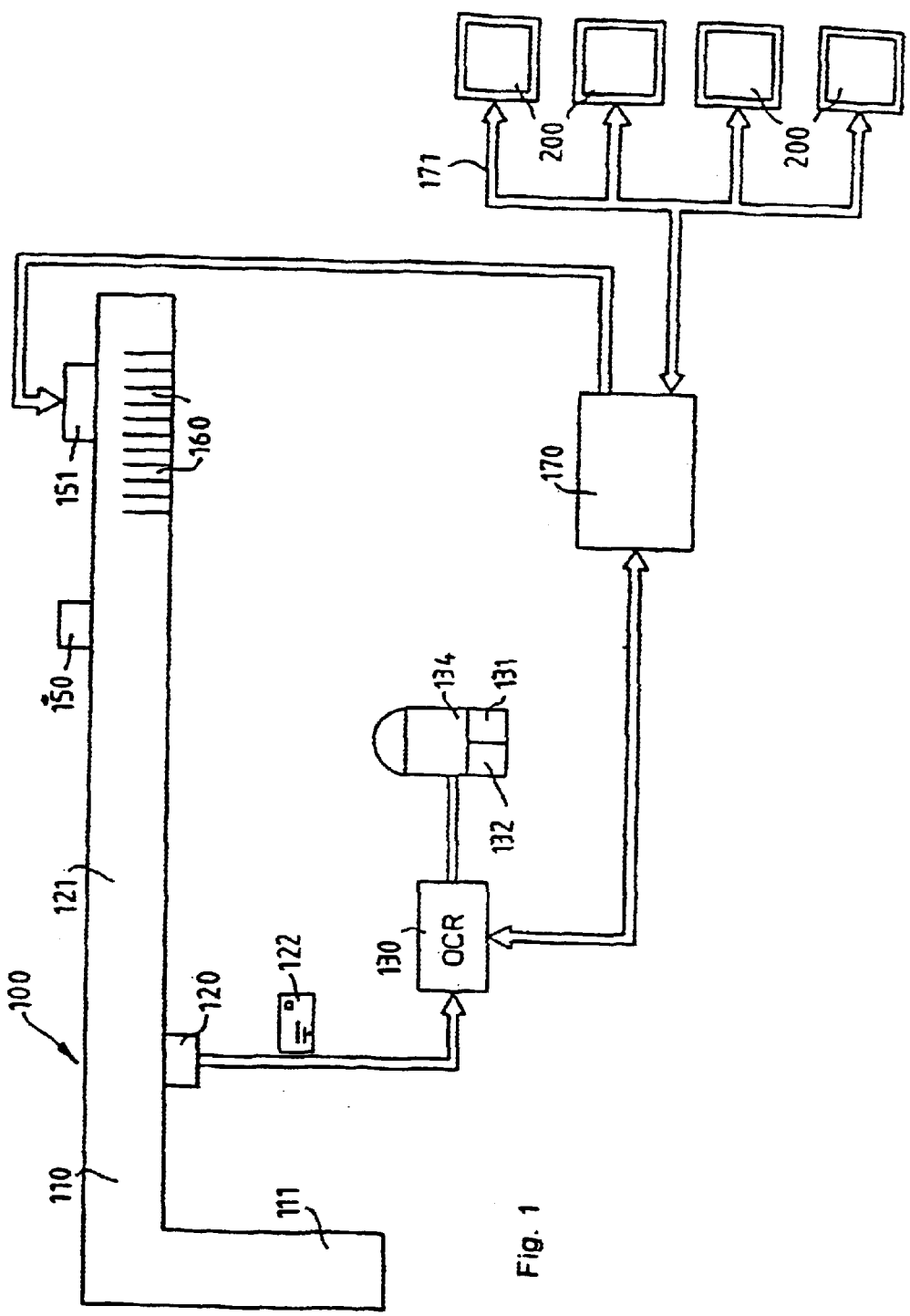
FIG. 1 a schematic representation of a device for executing the method of an embodiment of the invention.

According to the figure, an OCR parcel or small-package/periodical sorter 100 comprises a feed 110, which successively retrieves the mail items from a magazine 111 and transports them to a high-resolution video scanner 120. The items are then transported in a delay segment 121. During the transport, the required address information of the item images 122, which was obtained by the video scanner 120, is evaluated in the OCR processor 130. In the case of a complete evaluation, a barcode printer 150 is actuated, and the item is imprinted with a corresponding barcode for subsequent sorting in sorting compartments 160. The OCR processor 130 comprises one or a plurality of microprocessors 131 having associated memories 132 for storing images 122 of the items. The OCR processor further includes an address directory 134 with ZIP codes, city names, street names and, if applicable, further address-related information.

The device also includes an image controller 170 and a plurality of video-coding stations 200, which are connected to the image controller 170 directly or by a local network (LAN) 171. If the OCR evaluation of an image was unsuccessful, this image is transferred from the OCR processor 130 to the image controller 170, which controls a TID barcode printer 151, on the one hand and, on the other hand, transmits the corresponding image to one of the video-coding stations 200. The TID barcode printer 151 applies an identification code TID to the corresponding item, which permits the evaluated address information to be linked to the physical item at a later time. The images are evaluated offline in this case, although an online evaluation with video coding is preferably performed with a sufficient delay time. In the latter case, the TID can also be applied to the items at a later time, i.e., when the video coding has not resulted in a complete evaluation within a certain, predetermined time.

The image controller 170 ensures that the method is executed properly, including the data exchange between the OCR processor 130 and the video-coding stations 200 and the superposing of the images on a grid.

For executing the method, which is described in detail below, the image controller 170 is embodied such that address information. that was not completely evaluated in the video coding with the use of the results of the video coding in the OCR processor is supplied to a further automatic address evaluation.

Figure 2:
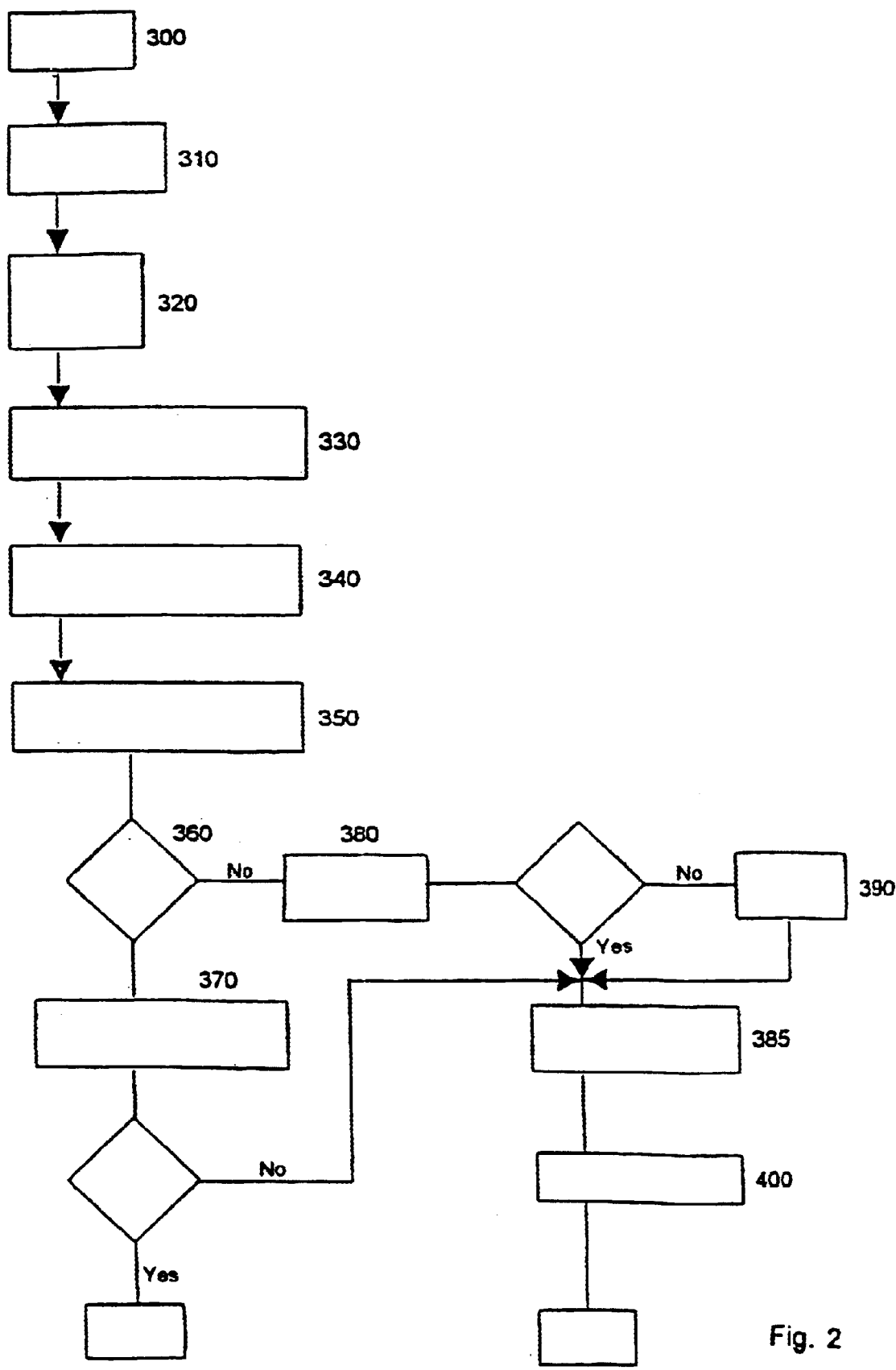
FIG. 2 a flow chart for the method.

The procedure is illustrated by the flow chart in FIG. 2.

First, an automatic OCR recognition process 300 is effected in the recorded image of the item surface containing the distribution information. The steps are performed as follows: a) a search of the region with the information of interest (ROI), including the determination of orientation; b) following a successful search, the execution of the actual recognition process with the recognition of the individual characters and, afterward, the information content. If no distribution information is ascertained and unambiguously recognized in the image 310, the image of the entire surface is superposed with a grid network on the monitor of a video-coding station 320. This grid divides the image into numerous segments. The operator then types in the corresponding segment number to select the segment that contains a large portion of the distribution information (e.g. an address label) 330. To ensure that all of the distribution information is registered, not only is the entered image segment, but surrounding regions, evaluated (340) in a new OCR recognition attempt 350. In this new recognition attempt, it is also determined whether a region of interest (ROI) is present 350 and, if one is, the actual recognition process 370 is performed for the region ROI. If the information recognition is successful, the process is concluded. If the information recognition is unsuccessful in this second attempt, the evaluated region is displayed 380, 385 on the monitor of the video-coding station. If the region of interest ROI has already been determined, this region is directly displayed on the monitor 385 with a corrected orientation; if the orientation is incorrect, the operator must manually rotate the image 390. The region of interest is then video-coded 400.

Figure 3:
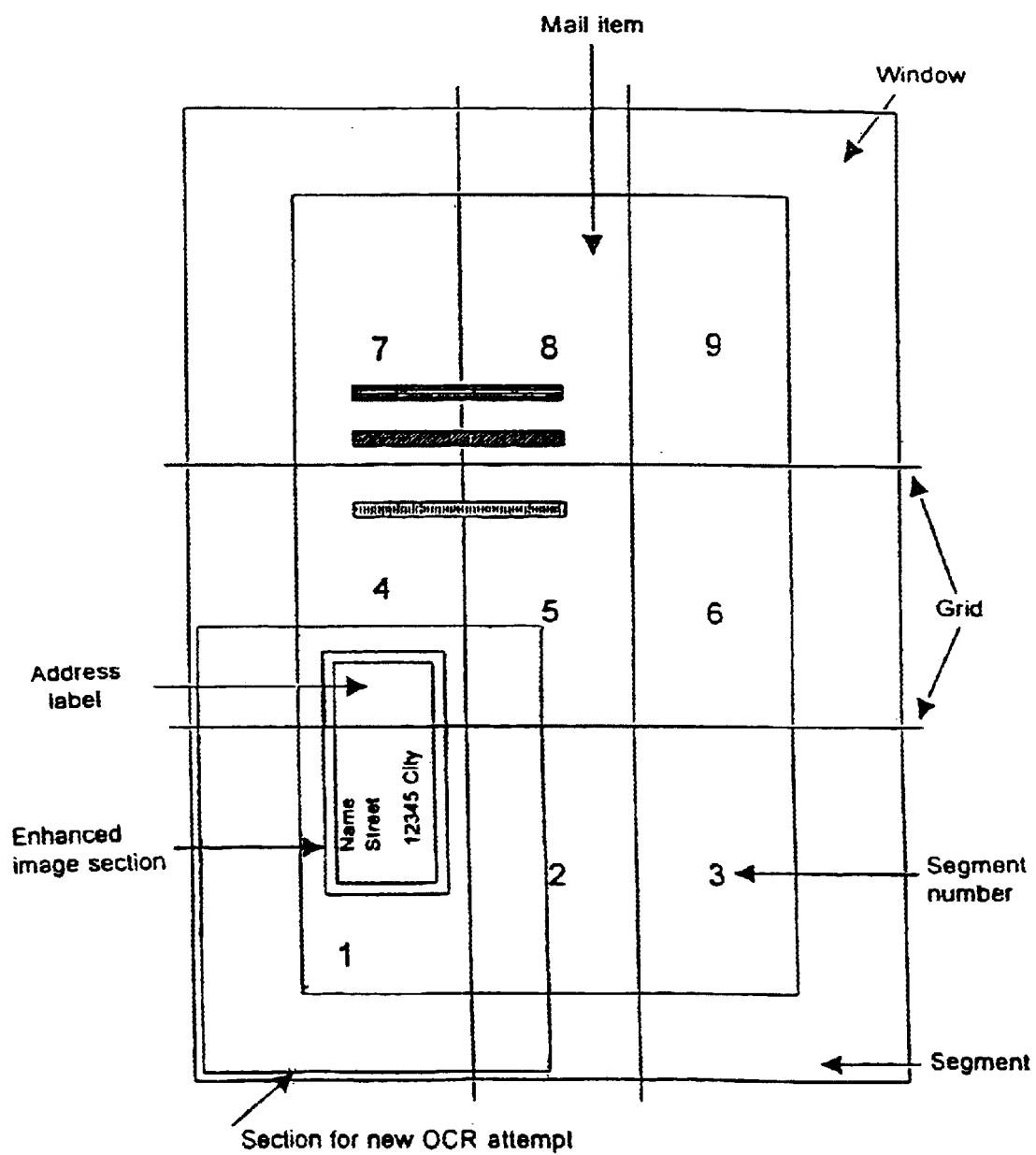
FIG. 3 a monitor layout for the video coding.

FIG. 3 illustrates the monitor layout.

The entire surface of the mail item containing the address information is displayed on the monitor. A grid and optionally-displayed segment numbers are used to divide the item into segments. The operator selects the segment containing the largest portion of the distribution information to be evaluated (recipient's name and address), in this case segment number 1. If this region was assessed as an address label in the previous OCR process, it is optically enhanced in the display. The operator enters an as confirmation. Had the search of the region of interest in the automatic OCR evaluation been unsuccessful (no optical enhancement of the region), the operator would enter the number of the segment, in this example the number 1. In,the repeated OCR evaluation, a corresponding image section is processed; this section contains such large marginal regions next to the segment of interest that it encompasses the entire address label.

What is claimed is:

1. A method of recognizing distribution information on mail items, in which an image of a surface of each mail item containing the distribution information is obtained and evaluated by means of automatic OCR recognition methods and video coding, the method comprising:
   a) performing a first automatic search of a region of interest (ROI), the ROI being a region of the mail item containing the distribution information, the search including determining an orientation of the distribution information and performing a first automatic OCR recognition;
   b) displaying an entire image of the surface containing the distribution information on a video-coder monitor if the first automatic OCR recognition yields an ambiguous result;
   c) dividing the image on the video-coder monitor into image segments with a grid;
   d) manually selecting the image segment from the displayed image that contains a portion of the ROI via a single keystroke;
   e) performing a second automatic search of a new region containing the distribution information, where the new region is designated by the manually selected image segment and includes marginal regions of segments adjacent to the manually selected image segment such that the new region encompasses the distribution information; and
   f) performing a second automatic OCR evaluation of the new region containing the distribution information.

2. The method according to claim 1, further comprising, representing only the new region on an enlarged scale on the video-coding monitor such that the distribution information is oriented with a correct orientation and position based on information from the second OCR evaluation, and no video coding is performed, if the new region containing the distribution information is unambiguously evaluated with the second automatic OCR evaluation.

3. The method according to claim 1, wherein the single keystroke is effected in a video-coding station.

4. The method according to claim 1, further comprising visually enhancing the region containing the distribution information, which was ascertained in the first automatic search, on the monitor.

5. The method according to claim 1, further comprising:
   determining if the results of the second automatic OCR evaluation are ambiguous; and
   performing a third automatic OCR evaluation, which employs the results of the video coding if the results of the second OCR evaluation are ambiguous.

6. The method according to claim 5, further comprising:

determining if the results of the third automatic OCR evaluation are ambiguous; and performing a fourth automatic OCR evaluation, which employs the results of the third automatic OCR evaluation if the results of the third automatic OCR evaluation are ambiguous.

7. A device for recognizing distribution information on mail items, comprising means for obtaining images of mail items;

means for automatic OCR evaluation of distribution information contained in the images of the mail items, including means for performing a search of distribution information;

at least one video-coding station that includes a monitor and an input device for video coding by manually selecting an image segment; and an image controller receiving the images of mail items, generating a grid and a superposed display with the image of the mail item containing the distribution information on the monitor of the video-coding station, generating an enlarged image section, comprising the selected image segment and border regions to all adjacent segments, and if the evaluation is ambiguous, representing the enlarged image section on the monitor of the video-coding station with the distribution information corrected in terms of orientation and position and transferring the enlarged image section and the distribution information that was ambiguously evaluated by the video coding to the means for automatic OCR evaluation for a second evaluation based on the enlarged image section.

* * * * *